W. R. STRICKLAND.
PISTON RING.
APPLICATION FILED JAN. 7, 1914.

1,287,133.

Patented Dec. 10, 1918.

Witnesses
E. B. Fitchied
L. I. Porter

Inventor
William R. Strickland
by Thurston & Kwis
Attys.

UNITED STATES PATENT OFFICE.

WILLIAM R. STRICKLAND, OF CLEVELAND, OHIO, ASSIGNOR TO THE PEERLESS MOTOR CAR COMPANY, OF CLEVELAND, OHIO, A CORPORATION OF OHIO.

PISTON-RING.

1,287,133.  Specification of Letters Patent.  Patented Dec. 10, 1918.

Application filed January 7, 1914. Serial No. 810,742.

*To all whom it may concern:*

Be it known that I, WILLIAM R. STRICKLAND, a citizen of the United States, residing at Cleveland, in the county of Cuyahoga and State of Ohio, have invented a certain new and useful Improvement in Piston-Rings, of which the following is a full, clear, and exact description.

This invention relates to piston rings and has for its chief object to so arrange a plurality of coacting rings in the groove of a piston that leakage is prevented in a more effective manner than heretofore.

In accordance with my invention, I provide in the piston groove, a plurality of rings, two of which are arranged side by side and in contact with each other, with the breaks or joints cicumferentially displaced, together with means consisting preferably of a third ring arranged at the side of one of said pair of rings for producing a lateral wedging action, so as to press the two rings firmly together and against the adjacent wall of the groove in such a way that leakage of gas through the breaks or joints in the rings, at which points leakage generally takes place, is practically eliminated.

I may utilize simply three rings which will suffice for ordinary pressures, but for high pressures, I prefer to utilize in the groove five rings, two of which are arranged on each side of the wedging ring, as will be more fully explained hereafter.

My invention may be further briefly summarized as consisting in certain novel details of construction and combinations and arrangements of parts which will be described in the specification, and set forth in the appended claims.

Figure 1:
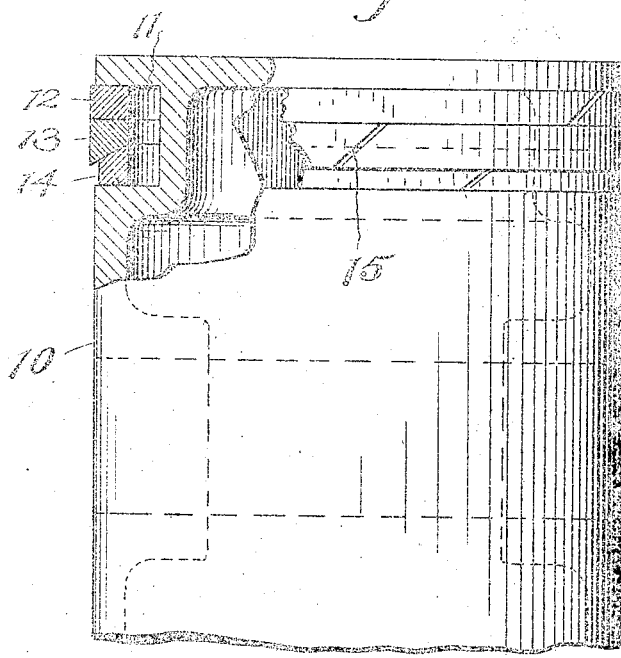
Figure 2:
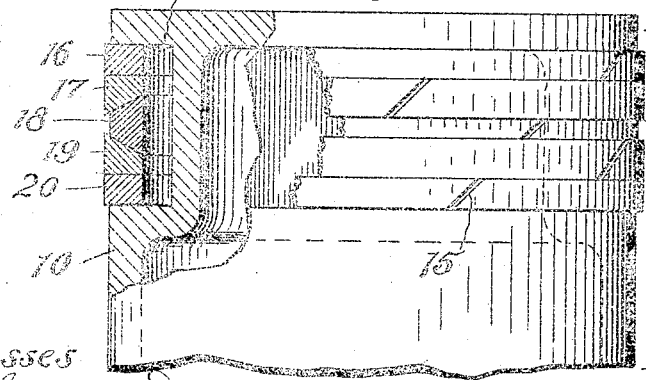

In the accompanying sheet of drawings, Figure 1 is an elevation with parts in section of a piston equipped with my invention; Fig. 2 is a similar view showing the use of five rings.

Referring now to the drawings, 10 represents the piston, which may be the piston of an internal combustion engine, and which is provided with a piston-ring groove, in which according to the invention as shown in Fig. 1, are arranged three split spring rings 12, 13 and 14. The two rings 12 and 13 are arranged side by side with their flat faces in engagement with each other, and with the ring 12 bearing against the adjacent end wall of the groove, these rings being of the same diameter. The ring 14 which is of less diameter than the rings 12 and 13, is employed for the purpose of producing a lateral wedging action, the inner face or side of this ring and the adjacent contacting face or side of ring 13 being tapered in such a manner that the tendency of the ring 14 to spring outward, produces a wedging action, which causes the rings 12 and 13 to bear firmly against each other, and the ring 14 to bear firmly against the adjacent end wall of the groove. The breaks or joints 15 in the three rings are preferably displaced circumferentially, it being particularly important that the breaks in the rings 12 and 13 be circumferentially displaced. With the present arrangement, leakage through the joints is minimized, due to the fact that the joint in each of the rings 12 and 13 is very effectively sealed by the other ring.

I am aware that it has been proposed heretofore to prevent leakage by the use of three coacting rings, but the arrangement of rings heretofore suggested has not produced the desired result, for the reason that the rings have not been properly arranged or constructed. For example, it has been proposed to place the wedging ring between the other two rings, but as the wedging ring must be of less diameter than the other two rings, if any wedging action is to be produced, the joints in the other two rings are not sealed, and gas may escape by passing through the joint of one ring, and thence circumferentially around the space between the middle ring of smaller diameter and the cylinder wall, and thence through the joint in the third ring. However, by placing the two rings of equal diameter side by side, and by the use of a third wedging ring which bears against one of these two rings, the object sought is attained in the most effective manner.

The construction shown in Fig. 1 will answer the requirements of most constructions, but for extremely high pressure, I prefer to provide a double seal or protection against leakage by utilizing on both sides of the wedging ring, a pair of rings, each pair having its joints effectively sealed, in the manner described with the construction shown in Fig. 1. For example, in Fig. 2, the groove 11 of the piston 10 is provided with five rings 16, 17, 18, 19, 20, the rings 16 and 17, and the rings 19 and 20 are of the same diameter, and all four are adapted to bear against the wall of the cylinder, the rings of each pair having their breaks or joints displaced circumferentially. The ring 18 which is arranged between the two pairs 16 and 17,—19 and 20 is a wedging ring which is of less diameter than the other rings, in order that the wedging action may be attained, and which has both of its side faces tapered and engaging correspondingly tapered faces of the rings 17 and 19. In consequence, with this construction, the rings of each pair are held firmly together, and each end ring is pressed against the adjacent end wall of the groove, with the result that there is provided a double seal or double protection against leakage.

The breaks or joints in the rings may be formed in any suitable manner, and the rings may be prevented from turning circumferentially in the groove in any of the well known ways, such as by pins extending from the base of the groove into the rings.

Having thus described my invention, what I claim is:

1. In combination with a piston having a piston ring groove, a plurality of rings in the groove including two split rings arranged side by side, the breaks or joints in the rings displaced circumferentially, and a third split ring engaging one of said first named rings, and having with the latter tapered faces so that a lateral wedging action is produced.

2. In combination with a piston having a piston ring groove, a plurality of split rings in the groove including two rings of uniform external diameter arranged side by side, with the joints or splits in the rings displaced circumferentially, and a third split ring engaging one only of the other two rings, said third ring being of less diameter than the other two rings, and said third ring and the ring which it engages having inclined faces which press the other two rings together, and press one of the other two rings against the wall of the groove adjacent thereto.

3. In combination with a piston having a piston ring groove, two pairs of split spring rings in the groove, the breaks or joints of the rings of each pair being displaced circumferentially, and means between the two pairs of rings for spreading the two pairs so that the rings of each pair are pressed against each other and so that the end rings of the two pairs are pressed against the end walls of the groove.

4. In combination with a piston having a piston ring groove, a plurality of split rings in the groove comprising two pairs of rings, the breaks in the rings of each pair being displaced circumferentially, and a fifth ring arranged between the two pairs and engaging one ring of each pair, said fifth ring and the rings which it engages having inclined faces so that a lateral wedging action is produced by said fifth ring, pressing the rings of each pair together, and pressing the end rings of the two pairs against the end walls of the groove.

In testimony whereof I hereunto affix my signature in the presence of two witnesses.

WILLIAM R. STRICKLAND.

Witnesses:
L. I. PORTER,
A. F. KWIS.